United States Patent
Mital et al.

(10) Patent No.: US 8,135,697 B2
(45) Date of Patent: Mar. 13, 2012

(54) SEARCH-FRIENDLY TEMPLATES

(75) Inventors: Vijay Mital, Redmond, WA (US); Suraj T. Poozhiyil, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 12/393,801

(22) Filed: Feb. 26, 2009

(65) Prior Publication Data

US 2010/0218139 A1 Aug. 26, 2010

(51) Int. Cl.
G06F 7/00 (2006.01)
(52) U.S. Cl. ........................................ 707/706
(58) Field of Classification Search ............. 707/779, 707/706
See application file for complete search history.

(56) References Cited

U.S. PATENT DOCUMENTS

| | | | |
|---|---|---|---|
| 6,411,961 B1 | 6/2002 | Chen et al. | |
| 6,789,252 B1 | 9/2004 | Burke et al. | |
| 6,920,458 B1 | 7/2005 | Chu et al. | |
| 2005/0050054 A1* | 3/2005 | Clark et al. | 707/100 |
| 2005/0080640 A1 | 4/2005 | Bhaskaran | |
| 2006/0070024 A1* | 3/2006 | Park | 717/106 |
| 2007/0156418 A1 | 7/2007 | Richter et al. | |
| 2008/0140472 A1 | 6/2008 | Gilat et al. | |
| 2008/0189235 A1 | 8/2008 | Mital | |
| 2008/0301626 A1 | 12/2008 | Sivaram et al. | |

OTHER PUBLICATIONS

The Fabulous Forty Application Templates for SharePoint, Sherweb Inc. 1998-2008, pp. 1 http://www.sherweb.com/sharepoint-hosting/40-templates.
Domino Connector for Google—Selective Indexing. C-Search Limited, 2004-2007, pp. 1-6 http://www.c-search-solutions.com/website.nsf/google-selective-indexing.pdf.
Meng Fanchao et al.: A Specification-based Approach for Retrieval of Reusable Business Component for Software Reuse. International Journal of Computer Science, vol. 1, No. 4, pp. 283-290., 2007. http://www.waset.org/ijcs/v1/v1-4-38.pdf.
The Visible Business Templates. Visible System Corporation, 2004, pp. 1-4 http://www.visible.com/Products/BusinessTemplates/index.htm.

* cited by examiner

Primary Examiner — Jensen Hu
(74) Attorney, Agent, or Firm — Merchant & Gould P.C.

(57) ABSTRACT

Embodiments are provided for searching for templates utilized for managing data in a computer application program. Multiple templates for managing data are indexed as individual documents to facilitate the searching of data contained therein. Each individual document includes multiple sub-documents and a model which describes the multiple sub-documents. A data query may be received in the computer application program for one or more templates to utilize in managing the data. In response to receiving the data query, the indexed templates are searched for one or more templates which satisfy the data query. One or more template suggestions may then be displayed as a search result for satisfying the data query.

14 Claims, 4 Drawing Sheets

SEARCH-FRIENDLY TEMPLATES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Data management applications allow for the creation of custom applications for managing various types of data ranging from contact and order management to keeping records of baseball card purchases and auctions. The custom applications may include data structure definitions (e.g., an order or a customer), form definitions (e.g., an order entry form or a customer contact form), and business logic (e.g., when a customer has been contacted three times at an e-mail address without a reply, then mark the e-mail address as 'invalid').

In order to facilitate the creation of custom applications, many data management applications provide templates which contain a commonly used set of data structures, forms and business logic. Current templates however, suffer from a number of drawbacks. One drawback is that data management applications often provide a large number of templates for the same or similar processes, each of which must be manually utilized by a user to determine which one is the most appropriate for the user's needs (e.g., a data management application may provide hundreds of templates related to order management processes). Another drawback is that many applications provide templates which are not customizable (i.e., extendible) with respect to the current or future needs of the user. For example, applications may not provide any templates which completely satisfy a user's current needs or they may provide templates which are initially useful but will later be obsolete as the user's needs change in the future. While some data management applications do allow for template customization, these applications require that the user have a detailed knowledge and understanding of a template's functionality and are further designed to plug into a larger 'master application' in which all of the templates are merely preordained extensions of the master. Thus, template customization may not be accomplished without constantly referring to the structure of the master application. Currently however, database applications do not allow for the defining of relationships which specify how database template tables are joined with one or more database tables in an existing database. In addition, for database template tables that have been joined, current database applications do not provide for viewing extended database template tables or forms created from the linking or merging of one or more database tables in an existing database. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for searching for templates utilized for managing data in a computer application program. Multiple templates for managing data are indexed as individual documents to facilitate the searching of data contained therein. Each individual document includes multiple subdocuments and a model which describes the multiple subdocuments. A data query may be received in the computer application program for one or more templates to utilize in managing the data. In response to receiving the data query, the indexed templates are searched for one or more templates which satisfy the data query. One or more template suggestions may then be displayed as a search result for satisfying the data query.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for searching for templates utilized for managing data in a computer application program. Multiple templates for managing data are indexed as individual documents to facilitate the searching of data contained therein. Each individual document includes multiple subdocuments and a model which describes the multiple subdocuments. A data query may be received in the computer application program for one or more templates to utilize in managing the data. In response to receiving the data query, the indexed templates are searched for one or more templates which satisfy the data query. One or more template suggestions may then be displayed as a search result for satisfying the data query.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
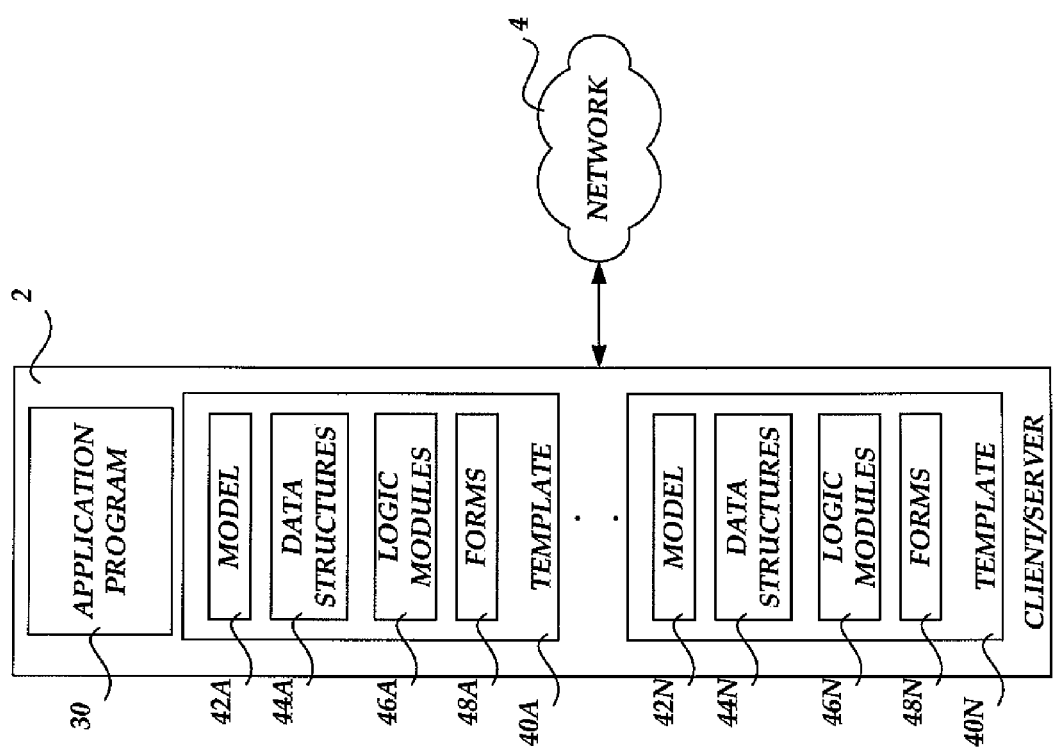
FIG. 1 is a block diagram illustrating a network architecture for searching for templates utilized for managing data in a computer application program, in accordance with various embodiments.

Referring now to the drawings, in which like numerals represent like elements through the several figures, various aspects of the present invention will be described. FIG. 1 is a block diagram illustrating network architecture for searching for templates utilized for managing data in a computer application program, in accordance with various embodiments. The network architecture includes a client/server computer 2 (hereinafter referred to as the "computer 2") which is in communication with a network 4 which may include a local network or a wide area network (e.g., the Internet). It should be understood that in accordance with various embodiments, the computer 2 may function as either a client computer or a server computer. The computer 2 may store an application program 30 and templates 40A-40N. As will be described in greater detail below in the discussion of FIGS. 2-3, the application program 30 may be utilized to search the templates 40A-40N for one or more templates to manage data. To that end, in accordance with various embodiments, application program 30 may comprise any of a number of data management software applications for managing data on the computer 2. For example, in accordance with various embodiments, the application program 30 may comprise the ACCESS database software, the EXCEL spreadsheet software, the SQL SERVER database software, all of which are manufactured by MICROSOFT CORPORATION of Redmond, Wash. It should be understood that the embodiments described herein should not be construed as being limited to the aforementioned software applications and that other data management software applications from other developers and/or manufacturers may also be utilized.

The templates 40A-40N stored on the computer 2 include models 42A-42N, data structures 44A-44N, logic modules 46A-46N, and forms 48A-48N. In accordance with various embodiments, the templates 40A-40N may be previously indexed as individual documents with each document comprising a model (which describes a template) and a number of subdocuments (i.e., data structures, logic modules and forms) to facilitate searching. It will be appreciated that the models utilized in the templates 40A-40N may include schemas which describe the data structures, logic modules, and forms in each template. In accordance with various embodiments, each document and subdocument may be indexed using various search engine techniques known to those skilled in the art including, but not limited to, term occurrence weighting and vector space modeling (in which each document/subdocument is treated as a vector). In particular, the models 42A-42N may describe, at a user-readable abstraction level, data structures (including binding to business logic), relationships between data structures, and forms (including data binding and binding to business logic). As known to those skilled in the art, data structures may include customer orders, forms may include documents for order entries or customer contact information, and business logic may include business decisions such as "when an order is deleted, also delete the line item," when a customer has been contacted three times at an email address without a reply, mark the email address as "invalid," or "in the order entry form, ensure that the user is forced to enter a 'promise date' that is no less than 5 days after the date of the order being placed." It should be understood that the models 42A-42N may be described as programs (e.g., applications) as opposed to documentation of programs. In accordance with an embodiment, the models may be described using a markup language. The markup language may be defined in a data schema without the use of proprietary instructions that can only be interpreted by a specific computing platform instance. The markup language (used to describe the models) may describe a system (or application) for data tracking. The system may include data schema (i.e., well-defined types of information the application is used to keep track of), logic (i.e., custom behaviors of the system which must be respected when the application is run), and user interfaces (means for users to interact with the system including, but not limited to, graphical representations such as forms or reports). For example, the markup language may describe a "forms" user interface for viewing, searching, and changing data. The user interface may include the ability to supply custom logic that runs as a part of the experience of working with data. The functionality and structure of the models 42A-42N with respect to data structures, forms and business logic is described in greater detail in related patent application U.S. Ser. No. 12/147,830 entitled "Platform-Independent Data Application Description Language," filed on Jun. 27, 2008, the disclosure of which is incorporated herein, in its entirety, by reference.

It should be understood that the various components of the network architecture comprising the computer 2 and the network 4 may be configured using a distributed operating system for web-based applications such as the operating system in SHAREPOINT services technology developed by MICROSOFT CORPORATION of Redmond, Wash. As is known to those skilled in the art, SHAREPOINT services technology enables users to create, maintain, and present a collaborative environment to share information. Using the technology, a user or organization can create one or more websites to provide and share information (e.g., documents on a web server or web folder, etc.) for other users associated with the websites. It should be understood that the embodiments described herein should not be construed as being limited to SHAREPOINT services technology and that other collaborative services technology from other developers and/or manufacturers may also be utilized. It should further be understood that the network architecture of FIG. 1 and its components include functionality to communicate with other computing devices, communication devices, and/or other systems and are not intended to be limited to the embodiments and examples described herein.

Exemplary Operating Environment

Figure 2:
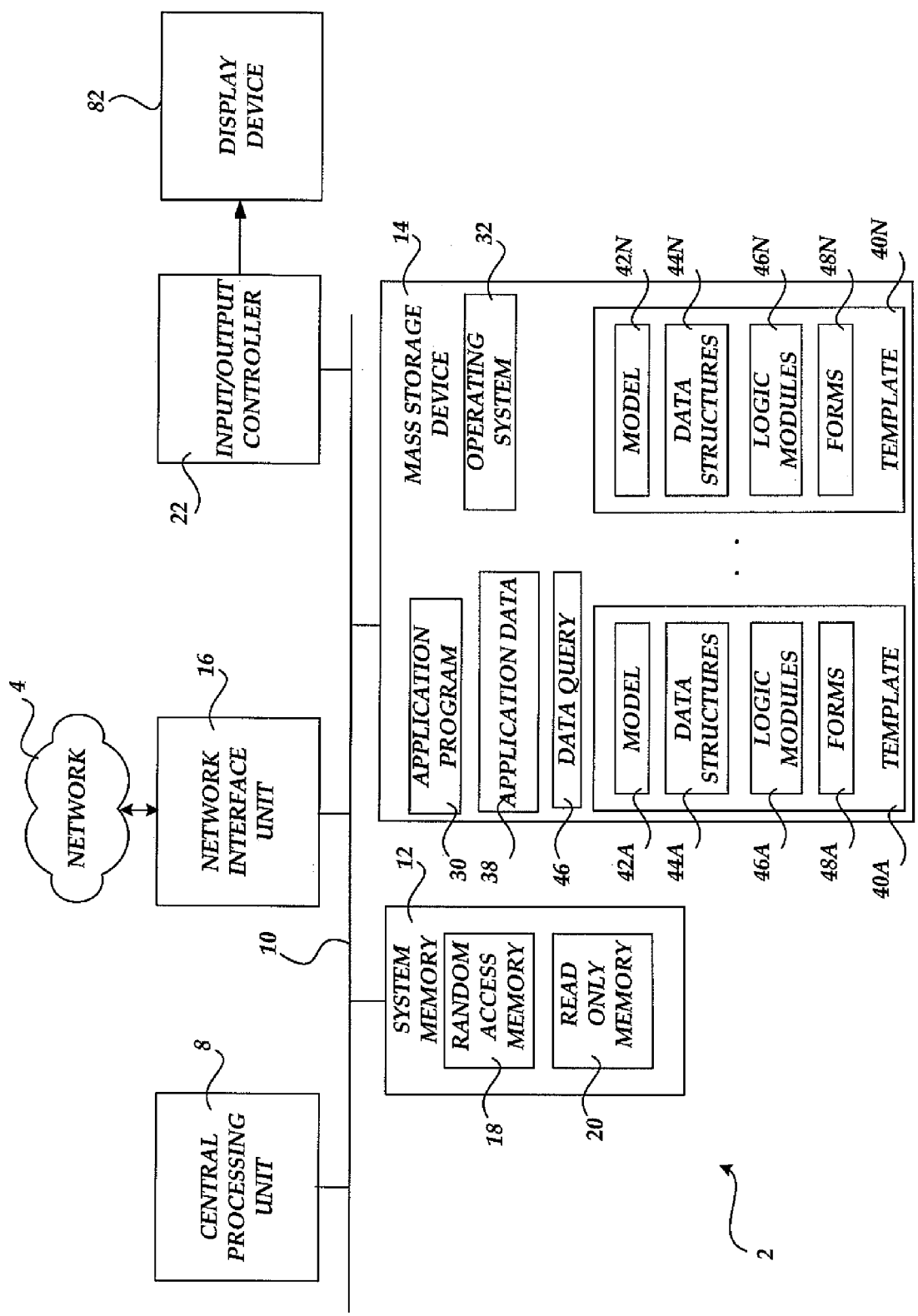
FIG. 2 is a block diagram illustrating a computing environment which may be utilized for searching for templates utilized for managing data in a computer application program, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing the application program 30, an operating system 32, application data 38, the templates 40A-40N (described above with respect to FIG. 1), and a data query 46. In accordance with various embodiments, the application data 38 may include contacts data, customer order data, and/or employee data which may be managed by one or more of the templates 40A-40N. The data query 46, in accordance with various embodiments, may be received in the application program 30 from a user to search the templates 40A-40N for one or more templates (i.e., a single template or a group of templates) to manage the application data 38 or, alternatively, to extend the functionality of a previously existing template (e.g., a previously selected and currently used template) used in managing the application data 38. It should be understood by those skilled in the art that a number of methods may be utilized by a user of the application program 30 to search the templates 40A-40N including, but not limited to, Boolean and co-occurrence. In accordance with one embodiment, the data query 46 may comprise a search string containing key concepts (e.g., search terms) that may occur within the model and subdocuments comprising a template. In accordance with another embodiment, the data query 46 may comprise a request from a user of the application program 30, who is currently using one or more of the templates 40A-40N, to search for another template that is similar (e.g., "like this" or "like this in the following way . . . ") or dissimilar (e.g., "quite unlike this" or "unlike this in the following way . . . "). In accordance with another embodiment, the data query 46 may comprise a request from a user of the application program 30 to search for another template that is similar to a group of templates the user has already selected. In accordance with another embodiment, the data query 46 may comprise a request from a user of the application program 30 to search for a template (from among the templates 40A-40N) that is "complementary" to a particular template or group of templates identified by the user. In accordance with the aforementioned embodiment, a complementary template may be described in terms of the presence or absence of model elements (i.e., data structures, logic modules, and forms) which are present in another template or group of templates. It should be understood that the search patterns described in the aforementioned embodiments may be utilized individually or in combination with each other.

In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the computer 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the computer 2 may operate in a networked environment using logical connections to remote computers through the network 4 which, as discussed above, may include a local network or a wide area network (e.g., the Internet). The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means (not shown). Similarly, an input/output controller 22 may provide output to a display device 82 as well as a printer, or other type of output device (not shown).

Figure 3:
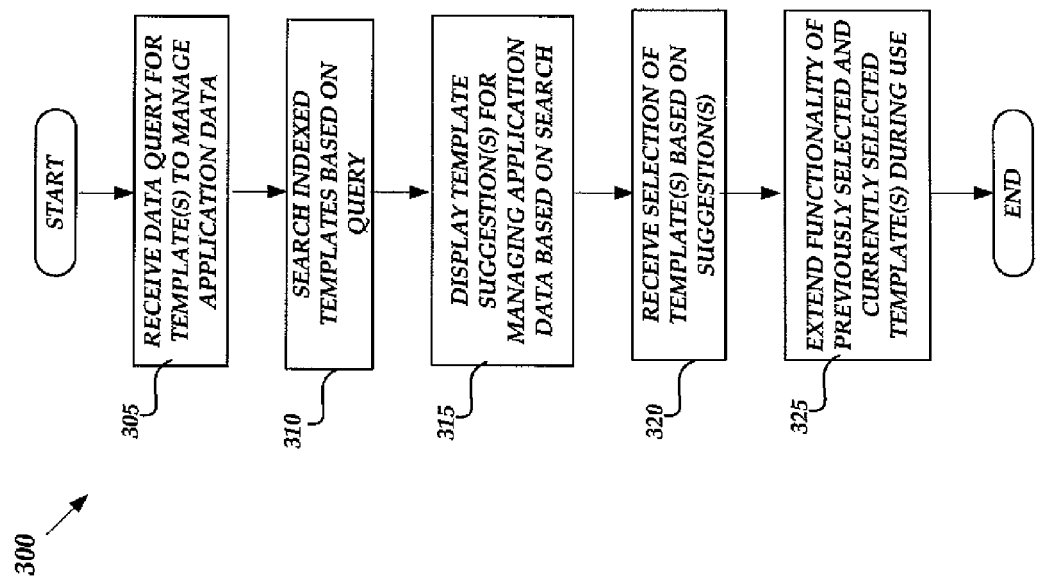
FIG. 3 is a flow diagram illustrating a routine for searching for templates utilized for managing data in a computer application program, in accordance with various embodiments.

FIG. 3 is a flow diagram illustrating a routine 300 for searching for templates utilized for managing data in a computer application program, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 3 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the application program 30 (which is executed by the central processing unit 8 on the computer 2) for one or more of the templates 40A-40N to manage the application data 38. As discussed above with respect to FIG. 1, each of the templates 40A-40N may be indexed as individual documents comprising models 42A-42N, data structures 44A-44N, logic modules 46A-46N, and forms 48A-48N. In accordance with an embodiment, the data query 46 may be initiated by a user entering data directly into the application program 30. For example, a user may type in contact information including an employee's first name, a last name, and an address into a database or spreadsheet application program in order to search for a template or templates useful in managing employee contacts information.

From operation 305, the routine 300 continues to operation 310, where the application program 30 executing on the computer 2 performs a search of the (indexed) templates 40A-40N based on the data query 46. As discussed above with respect to FIG. 2, the template search may include Boolean and co-occurrence search patterns. In accordance with another embodiment, the template search may also be based on feedback requested and received from users who have previously used the templates 40A-40N, by the application 30. For example, the search may utilize feedback, received by the application program 30, from previous users (i.e., individuals and/or social groups) who have used a first template to manage data associated with a business goal but found that a second template was useful to add to the first template in achieving the desired business goal. In accordance with other embodiments, the search performed by the application program 30 may also utilize thesauri, dictionaries, and concept taxonomies (e.g., categorizations of business goals/process functions and their hierarchical breakdown inter term so the data, forms or business logic that is used or involved in fulfilling a business goal/function).

From operation 310, the routine 300 continues to operation 315, where the application program 30 executing on the computer 2 may display (e.g., on the display device 82 of the computer 2) one or more template suggestions as search results for managing the application data 38 based on the search performed at operation 310. In particular, in accordance with an embodiment, the application program 30 may be configured to generate a user interface which displays the name of a template or a group of templates from among the templates 40A-40N which satisfies the data query 46 in a "wizard" element (where a user is presented with a sequence of dialog boxes) or in a list accessible via a dropdown user control. In accordance with another embodiment, the search results may be presented graphically to the user as a thumbnail of a template populated with sample data. For example, a template suggestion in response to a data query comprising employee contacts data may include a report which allows a user to group employees by each employee's manager.

From operation 315, the routine 300 continues to operation 320, where the application program 30 executing on the computer 2 receives a selection of the one or more templates 40A-40N suggested at operation 315. In particular, a user selects a template or a group of templates suggested by the application program 30, in response to the data query 46, for managing the application data 38. In accordance with an embodiment, the suggested templates may remain displayed to the user while selecting a template or template group for use, so that the user does not have to resubmit the initial data query 46 to view the template suggestions generated by the application program 30.

From operation 320, the routine 300 continues to operation 325, where the application program 30 executing on the computer 2 extends the functionality of a previously or currently selected template or templates (from the templates 40A-40N). In accordance with an embodiment, the application program 30 may be configured to extend the functionality of a previously selected template by merging the previously selected template in response to receiving the selection of a template or template group (which may include database tables or forms) at operation 320. An extended "view" of the merged template may then be displayed to a user of the application program 30. In accordance with another embodiment, the application program 30 may receive another or subsequent data query to extend functionality of the selected template or group of templates (from the templates 40A-40N) while the selected template (or group of templates) is being used. In accordance with one embodiment, the subsequent data query may include a request to search for another template that is similar (e.g., "like this" or "like this in the following way . . . ") or dissimilar (e.g., "quite unlike this" or "unlike this in the following way . . . "). In accordance with another embodiment, the subsequent data query may comprise a request from a user to search for another template that is similar to a group of templates the user has already selected. In accordance with another embodiment, the subsequent data query may comprise a request from a user to search for a template (from among the templates 40A-40N) that is "complementary" to a particular template or group of templates identified by the user. As discussed above with respect to FIG. 2, the complementary template may be described in terms of the presence or absence of model elements (i.e., data structures, logic modules, and forms) which are present in another template or group of templates. For example, a user having selected a template for managing employee contacts data comprising employee names and addresses may further wish to extend the functionality of the selected template to include skills associated with each listed employee. In such an instance, a user of the application program 30 may submit a subsequent query to search for templates which include models, data structures, logic modules, or forms associated with employee skills. An illustrative computer screen display of a user interface for displaying extended functionality associated with templates for managing data in the computer application program 30 is discussed with respect to FIG. 4, below.

Figure 4:
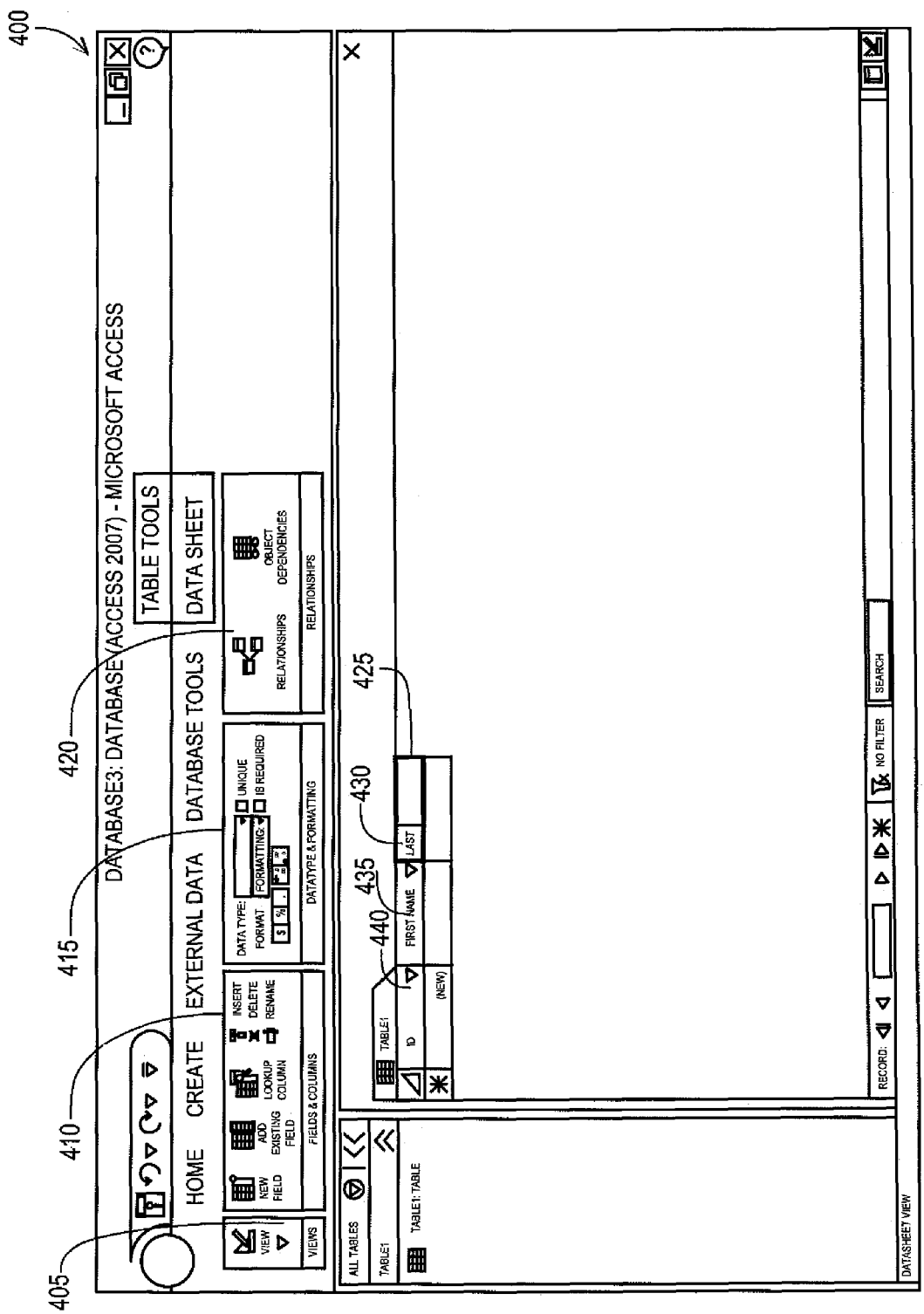
FIG. 4 is an illustrative computer screen display of a user interface for displaying extended functionality associated with templates for managing data in a computer application program, in accordance with an embodiment.

FIG. 4 is an illustrative computer screen display of a user interface 400 for displaying extended functionality associated with templates for managing data in a computer application program, in accordance with an embodiment. It should be understood that the user interface 400 is illustrative and thus those skilled in the art should appreciate that the user interface 400 represents only one of various configurations and types of user interfaces that may be utilized in accordance with various embodiments for displaying extended functionality associated with templates for managing data in a computer application program. In accordance with an embodiment, the user interface 400 may be generated by the application program 30 and includes a Views toolbar 405, a Fields and Columns toolbar 410, a Data Type & Formatting toolbar 415, and a Relationships toolbar 420. The toolbars 405-420 may be utilized for creating database fields, forms, and templates for managing data. The user interface 400 also includes an extended template 425 which may be utilized, for example, in managing employee data. The extended template 425 includes a Last (Last Name) field 430, a First Name field 435, and an ID field 440. In accordance with an embodiment, the ID field 440 represents a new field from another template that has been merged into an existing employee data template (represented by the fields 430 and 435) to provide for the entry of employee identification data for each employee. As discussed above with respect to operation 325 of FIG. 3, the extended template 425 may be created in response to receiving the selection of a template or template group (which may include database tables or forms) or in response to receiving another or subsequent data query to extend functionality of the selected template or group of templates while the selected template (or group of templates) is being used.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for searching for templates utilized for managing data in a computer application program, comprising:
   receiving, by the computer, a data query in the computer application program for at least one template from among a plurality of templates to utilize in managing the data, wherein each of the plurality of templates is indexed as a document to facilitate searching, wherein the document comprises a model and a plurality of subdocuments, the model describing the plurality of subdocuments, the model comprising a data tracking application program including a data schema, the data schema comprising information types that the data tracking application program is utilized to keep track of;
   in response to receiving the data query, searching the plurality of indexed templates for at least one template to satisfy the data query;
   displaying at least one template suggestion as a search result, wherein the search result includes the at least one template for satisfying the data query; and
   receiving another data query to extend functionality of the at least one selected template while the at least one selected template is being used, wherein receiving the another data query to extend functionality of the at least one selected template while the at least one selected template is being used comprises receiving a request to search for another template that is at least one of similar to the selected at least one template and extends the functionality of the selected at least one template.

2. The method of claim 1 further comprising receiving a selection of at least one template based on the at least one template suggestion, for managing the data in the computer application program.

3. The method of claim 2, wherein receiving a selection of at least one template based on the at least one template suggestion comprises receiving a selection of a group of templates, based on the at least one template suggestion, for managing the data in the computer application program.

4. The method of claim 2, wherein receiving a selection of at least one template based on the at least one template suggestion, for managing the data in the computer application program comprises comprising displaying the at least one template suggestion while the selection of the at least one template is received.

5. The method of claim 2 further comprising, in response to receiving the selection of the at least one template based on the at least one template suggestion, extending functionality of a previously selected template, wherein extending the functionality comprises displaying an extended view of the previously selected template, the extended view comprising a view of a merged database table comprising the selected at least one template.

6. The method of claim 1, wherein receiving a data query in the computer application program for at least one template to utilize in managing the data comprises receiving a search string comprising key concepts occurring within the model and the plurality of subdocuments in at least one of the plurality of templates.

7. The method of claim 1, wherein in response to receiving the data query, searching the plurality of indexed templates for at least one template to satisfy the data query and for managing the data comprises searching the plurality of indexed templates using at least one of a Boolean, a co-occurrence, and a received template feedback data search pattern.

8. A computer system for searching for templates utilized for managing data in a computer application program, comprising:
   a memory for storing executable program code; and
   a processor, functionally coupled to the memory, the processor being responsive to computer-executable instructions contained in the program code and operative:
      receive a data query in the computer application program for at least one template from among a plurality of templates to utilize in managing the data, wherein each of the plurality of templates is indexed as a document to facilitate searching, wherein the document comprises a model and a plurality of subdocuments, the model describing the plurality of subdocuments, the model comprising a data tracking application program including a data schema, the data schema comprising information types that the data tracking application program is utilized to keep track of;
      in response to receiving the data query, search the plurality of indexed templates for at least one template to satisfy the data query;
      display at least one template suggestion as a search result, wherein the search result includes the at least one template for satisfying the data query; and
      receive another data query to extend functionality of the at least one selected template while the at least one selected template is being used, wherein the another data query to extend functionality of the at least one selected template while the at least one selected template is being used comprises a request to search for a complementary template to the selected at least one template, the complementary template comprising at least one of the presence and the absence of at least one of a plurality of elements in the model, the plurality of elements comprising the plurality of subdocuments, the plurality of subdocuments comprising data structures, logic modules, and forms.

9. The system of claim 8, wherein the processor is further operative to receive a selection of at least one template based on the at least one template suggestion, for managing the data in the computer application program.

10. The system of claim 9, wherein the processor, in receiving the selection of the at least one template based on the at least one template suggestion, is operative to display the at least one template suggestion while the selection of the at least one template is received.

11. The system of claim 9, wherein the processor, in response to receiving the selection of the at least one template based on the at least one template suggestion, is further operative to extend functionality of a previously selected template, wherein extending the functionality comprises displaying an extended view of the previously selected template, the extended view comprising a view of a merged database table comprising the selected at least one template.

12. A computer-readable storage medium comprising computer executable instructions which, when executed on a computer, will cause the computer to perform a method for searching for templates utilized for managing data in a computer application program, the method comprising:

receiving a search string in the computer application program, the search string comprising key concepts occurring within at least one template from among a plurality of templates to utilize in managing the data, wherein each of the plurality of templates is indexed as a document to facilitate searching using at least one of term occurrence weighting and vector space modeling, wherein the document comprises a model and a plurality of subdocuments, the model describing the plurality of subdocuments, the model comprising a data tracking application program including a data schema, the data schema comprising information types that the data tracking application program is utilized to keep track of;

in response to receiving the search string, searching the plurality of indexed templates for the at least one template using at least one of a Boolean, a co-occurrence, and a received template feedback data search pattern;

displaying at least one template suggestion as a search result, wherein the search result includes the at least one template for satisfying the search string;

receiving a selection of at least one template based on the at least one template suggestion, for managing the data in the computer application program;

in response to receiving the selection of the at least one template based on the at least one template suggestion, extending functionality of a previously selected template, wherein extending the functionality comprises displaying an extended view of the previously selected template, the extended view comprising a view of a merged database table comprising the selected at least one template; and receiving a query to extend functionality of the at least one selected template while the at least one selected template is being used, wherein the query to extend functionality comprises at least one of a request to search for another template that is at least one of similar to the selected at least one template and extends the functionality of the selected at least one template and a request to search for a complementary template to the selected at least one template, the complementary template comprising at least one of the presence and the absence of at least one of a plurality of elements in the model, the plurality of elements comprising the plurality of subdocuments, the plurality of subdocuments comprising data structures, logic modules, and forms.

13. The computer-readable storage medium of claim 12, wherein the at least one template suggestion is displayed during the selection of the at least one template.

14. The computer-readable storage medium of claim 13, wherein receiving a selection of at least one template based on the at least one template suggestion comprises:

receiving a selection of a group of templates, based on the at least one template suggestion, for managing the data in the computer application program; and displaying the at least one template suggestion while the selection of the at least one template is received.

\* \* \* \* \*